(12) United States Patent
Yoo et al.

(10) Patent No.: US 12,112,552 B2
(45) Date of Patent: Oct. 8, 2024

(54) LANE MARKER RECOGNITION

(71) Applicant: QUALCOMM Incorporated, San Diego, CA (US)

(72) Inventors: Seungwoo Yoo, Yongin-si (KR); Heesoo Myeong, Seoul (KR); Hee-Seok Lee, Seongnam-si (KR)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 17/655,500

(22) Filed: Mar. 18, 2022

(65) Prior Publication Data

US 2023/0298360 A1    Sep. 21, 2023

(51) Int. Cl.
 *G06V 20/56* (2022.01)
 *G06T 7/73* (2017.01)
 *G06V 10/82* (2022.01)
(52) U.S. Cl.
 CPC .............. *G06V 20/588* (2022.01); *G06T 7/73* (2017.01); *G06V 10/82* (2022.01); *G06T 2207/20081* (2013.01); *G06T 2207/20084* (2013.01); *G06T 2207/30256* (2013.01)
(58) Field of Classification Search
 None
 See application file for complete search history.

(56) References Cited

U.S. PATENT DOCUMENTS

| 10,955,855 | B1 * | 3/2021 | Tran ..................... G05D 1/0274 |
| 2018/0189577 | A1 * | 7/2018 | Yoo ........................ G06T 7/593 |
| 2019/0258251 | A1 * | 8/2019 | Ditty .................... G05D 1/0274 |
| 2020/0327338 | A1 * | 10/2020 | Philion ..................... G06T 7/73 |
| 2021/0287018 | A1 |  9/2021 | Yoo et al. |

FOREIGN PATENT DOCUMENTS

CN           111460984 A       7/2020

OTHER PUBLICATIONS

International Search Report and Written Opinion—PCT/US2023/062926—ISA/EPO—Jun. 7, 2023.
Lv H., et al., "Lane Marking Regression From Confidence Area Detection to Field Inference", IEEE Transactions on Intelligent Vehicles, IEEE, vol. 6, No. 1, Mar. 1, 2021, Jul. 15, 2020, pp. 47-56, XP011839577, ISSN: 2379-8858, the whole document.

\* cited by examiner

*Primary Examiner* — Vikkram Bali
(74) *Attorney, Agent, or Firm* — QUALCOMM Incorporated

(57) ABSTRACT

Certain aspects of the present disclosure provide techniques for lane marker detection. A set of feature tensors is generated by processing an input image using a convolutional neural network. A set of localizations is generated by processing the set of feature tensors using a localization network, a set of horizontal positions is generated by processing the set of feature tensors using row-wise regression, and a set of end positions is generated by processing the set of feature tensors using y-end regression. A set of lane marker positions is determined based on the set of localizations, the set of horizontal positions, and the set of end positions.

30 Claims, 8 Drawing Sheets

LANE MARKER RECOGNITION

INTRODUCTION

Aspects of the present disclosure relate to lane marker detection.

Modern vehicles are increasingly equipped with advanced driver assistance systems, which among other things, may include lane marker detection for assisted and autonomous driving functions. Existing techniques for lane marker detection techniques are slow, require significant manual configuration, and lack robustness across many driving scenarios. Thus, many existing systems for lane detection are not suitable for modern vehicles.

Accordingly, techniques are needed for improved lane marker detection.

BRIEF SUMMARY

Certain aspects provide a method, comprising: generating a set of feature tensors by processing an input image using a convolutional neural network; generating a set of localizations by processing the set of feature tensors using a localization network; generating set of horizontal positions by processing the set of feature tensors using row-wise regression; generating set of end positions by processing the set of feature tensors using y-end regression; and determining a set of lane marker positions based on the set of localizations, the set of horizontal positions, and the set of end positions.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain aspects of the one or more aspects and are therefore not to be considered limiting of the scope of this disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 1:
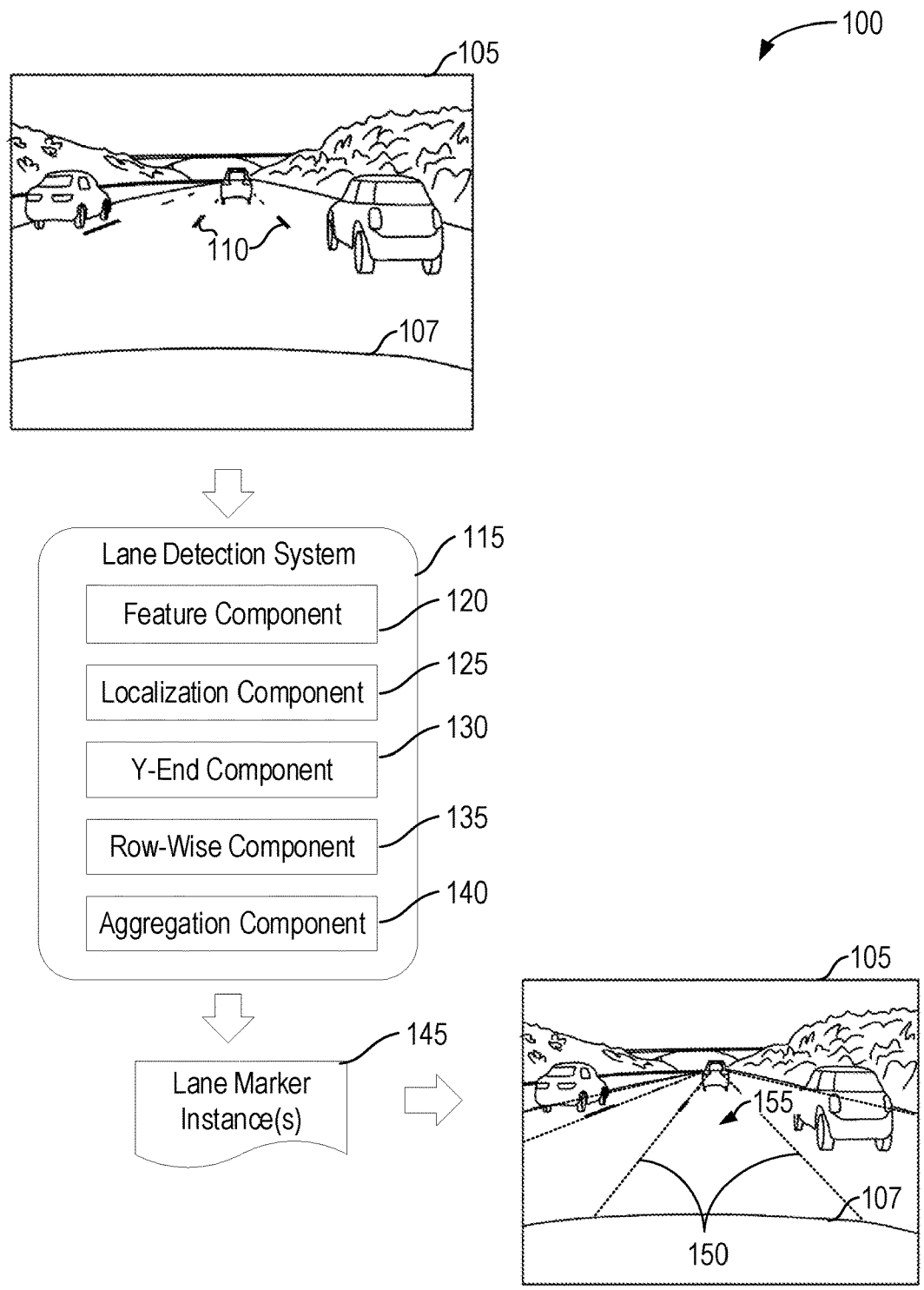
FIG. 1 depicts an example environment and system for lane marker detection using machine learning.

Aspects of the present disclosure provide techniques for improved lane marker detection. In some aspects, a multi-headed machine learning architecture (e.g., a model having multiple output heads) is used to separately generate lane marker localizations, horizontal (row-wise) positions, and end positions. By aggregating this data, the system is able to generate accurate lane marker instances quickly and efficiently.

Generally, a lane marker is a device or material on a road surface that conveys information, such as where lanes exist on a roadway. Examples of lane markers include painted traffic lines, painted cross-walks, painted parking spaces, reflective markers, curbs, gutters, Botts' dots, and rumble strips, to name a few.

Lane markers may be used by an assisted and/or autonomous vehicle navigation system. For example, a vehicle may include an advanced driver assistance system (ADAS) or a high-level self-driving system (SDS). Such systems are being widely adopted based in large part on concurrent improvements in computer vision technologies.

Although there are a number of components related to ADAS and SDS systems, such as lane marker detection, vehicle detection tracking, obstacle detection, scene understanding, and semantic segmentation, lane detection is a key component for camera perception and positioning. For example, lane detection is necessary for keeping a vehicle within the ego-lane (the lane in which the vehicle is positioned, which may also be referred to as a host lane), and for assisting the vehicle in changing lanes to the left or the right of the ego-lane.

Many conventional lane marker detection methods are based on semantic segmentation approaches. In the first stage of such approaches, a network is designed to perform a pixel-level classification that assigns each pixel in an image to a binary label: lane (or lane marker) or not lane (or not lane marker). However, in each pixel classification, the dependencies or structures between pixels are not considered, and thus an additional (significant) post processing is performed in the second stage to explicitly impose constraints, such as uniqueness or straightness of a detected line or lane marker. These post processing techniques require high computational complexity (causing them to be relatively slow) and generally require careful and manual integration into lane marker detection systems. As such, two-stage semantic segmentation approaches are difficult to deploy in various applications.

Additionally, computer vision-based approaches (e.g., using machine learning) have been introduced, but these are typically not robust and fail to accurately identify lane markers in a wide variety of common environments. Moreover, conventional lane detection systems typically have difficulty accurately identifying lane splits and merges (e.g., where lanes split and lane markers diverge, such as at an exit from a highway, or where lanes merge and lane markers converge, such as at an on-ramp to a highway).

Another problem with current lane marker detection methods is power consumption. Processing each image in a stream of images may require a great deal of computing power, which is not always available or practical in automotive contexts. In particular, for electric vehicles, power consumption of on-board systems is a significant consideration. Even for gas-powered vehicles, increased electric consumption can reduce fuel mileage due to higher alternator duty cycling.

Accordingly, improved lane marker detection systems and methods are needed. Aspects of the present disclosure provide techniques for accurate, robust, and efficient lane marker detection using a machine learning-based approach. In some aspects, a trained model (e.g., a convolutional neural network) is used to process images received from various image sensors in a vehicle and to generate features. These features are then provided to multiple independent "heads" (e.g., output layers or branches), each identifying a respective aspect of the lane markers, and the resulting output can be merged and aggregated to yield accurate lane instances that require minimal (or no) post processing and easily handle complex lane geometries, such as splits and merges.

In this way, aspects of the present disclosure reduce latency, computational expense, and power consumption of lane marker detection while improving accuracy and robustness of the detection, which beneficially result in improved safety and reliability of the platform.

Example Environment and System for Lane Marker Detection Using Machine Learning

FIG. 1 depicts an example environment 100 and system 115 for lane marker detection using machine learning.

In the illustrated example, an image 105 is provided to a lane detection system 115. As illustrated, the image 105 includes one or more lane markers 110. In an aspect, the image 105 may be captured by one or more imaging sensors in a vehicle, such as a car or truck with some level of self-driving or driver-assistance system. In the illustrated example, a portion of the vehicle 107 is visible, though in some aspects the vehicle itself may not be visible in the input image. In some aspects, the lane detection system 115 operates as a component (including hardware, software, or a combination of hardware and software) of the vehicle. In other aspects, all or a portion of the lane detection system 115 may be implemented on one or more other devices, such as via edge computing or cloud computing, when the vehicle has a data network connection.

Although a single image 105 is depicted in the illustrated example, in various aspects, the lane detection system 115 may generally receive any number of images simultaneously or in sequence. For example, the lane detection system 115 may receive frames from a video, processing one or more of the frames sequentially or in parallel to detect lane markers in the images.

In the illustrated example, the lane detection system 115 includes a feature component 120, a localization component 125, a y-end component 130, a row-wise component 135, and an aggregation component 140. Though illustrated as discrete components for conceptual clarity, in various aspects, the operations of the feature component 120, localization component 125, y-end component 130, row-wise component, and aggregation component 140 may generally be combined or distributed across any number of components and devices. Generally, the operations of these components may be implemented using hardware, software, or a combination of hardware and software.

In some aspects, input images (e.g., image 105) are delineated into a set of grid cells, patches, or regions based on a defined grid. For example, input images may be delineated into a 16 pixel grid (e.g., where each patch is a 16×16 pixel square). For example, if the image 105 is 192 pixels tall and 512 pixels wide and the grid is 16 pixels, then the image 105 may be delineated into a set of 384 patches (12 patches tall and 32 patches wide).

In one aspect, the feature component 120 can generally process the received image(s) 105 to extract or generate a set of features (e.g., one or more feature tensors) for the image 105. For example, in one such aspect, the feature component 120 may correspond to or include a trained neural network (e.g., a convolutional neural network). In at least one aspect, the feature component 120 uses a feature pyramid network (FPN) to extract the features of the image 105. Generally, a feature pyramid network is a machine learning architecture that uses a single-scale image as input and outputs feature maps at multiple different scales, enabling improved object detection in some aspects. Generally, the features are values, determined from the image 105, that are informative of the desired task (e.g., lane marker detection) in that they can be evaluated or analyzed by one or more downstream components to perform the task.

In the illustrated lane detection system 115, the localization component 125, y-end component 130, and row-wise component 135 may correspond to three respective heads of the model. That is, the feature component 120 may perform feature extraction for the model, and the localization component 125, y-end component 130, and row-wise component 135 may each act as separate heads providing separate outputs from the model. In some aspects, the localization component 125, y-end component 130, and row-wise component 135 may each correspond to one or more layers of a neural network (e.g., one or more convolution operations, tensor transformation operations, activation functions, and the like).

In one aspect, the localization component 125 generates lane marker localizations based on the features generated by feature component 120. The localizations may generally indicate, for each patch in the input image (e.g., for each 16×16 square of the image), a probability, confidence, or likelihood that the patch includes all or a portion of a lane marker, as discussed in more detail below. For example, in at least one aspect, the localization component 125 is trained to generate, for each patch, a value indicating the probability that the patch includes either the center of a lane marker (e.g., a point on the marker and equidistant between either visible end of the lane marker) or an end of a lane marker (e.g., either the nearest end or the furthest end). In some aspects, the use of additional ground truth localization positions (such as the ends of the markers) can increase the localization accuracy, as well as improve handling of images 105 depicting a lane split or merge, as discussed in more detail below.

In some aspects, the y-end component 130 is used to identify the end(s) of lane markers in the y-direction of the image 105 (e.g., vertically) based on the generated features. For example, in one such aspect, the y-end component 130 uses regression to identify the top end (the visible end nearest the top of the image 105) and the bottom end (the visible end nearest the bottom of the image 105) of each lane marker. These end positions can improve handling of lane splits and merges. As discussed below in more detail, these lane end positions may be used in conjunction with the localizations to generate lane marker instances.

In an aspect, the row-wise component 135 may generally use row-wise position estimation (e.g., using row-wise regression or classification, which involves regressing only in the horizontal direction) to identify the horizontal position of each lane marker based on the generated features. By regressing only in the horizontal direction (as opposed to full (x,y) regression in two directions), the row-wise component 135 can reduce computational complexity of the system. Generally, the row-wise component 135 generates a set of horizontal lane positions (e.g., indicating the row-wise lane marker position at given y-positions in the image 105). In some aspects, the row-wise component 135 uses a series of horizontal reduction modules (HRMs) to progressively squeeze or reduce the width of the input feature tensors (e.g., using horizontal pooling and/or pointwise convolutions) to compress spatial information and improve identification of the horizontal positions. As discussed below in more detail, these lane marker horizontal positions may be used in conjunction with the lane marker end positions and the lane marker localizations to generate lane marker instances.

In the illustrated example, the aggregation component 140 generally evaluates, combines, or otherwise aggregates the lane marker localizations (generated by the localization component 125), the lane marker end positions (generated by the y-end component 130), and the lane marker horizontal positions (generated by the row-wise component 135) to generate lane marker instances 145. In at least one aspect, the aggregation component 140 does so by identifying localization(s) exceeding a defined threshold (e.g., indicating at least a minimum probability that a lane marker exists in the position/region/patch), and identifies the corresponding horizontal position (from the set of horizontal positions) and end position(s) (from the set of end positions).

In an aspect, the aggregation component 140 can therefore generate a set of candidate lane marker instances (e.g., a set of vertices indicating the location of the lane marker), each including the aggregated localization data, horizontal position data, and end position data, where the localization value exceeds some defined threshold.

In some aspects, the aggregation component 140 can further apply one or more subsequent operations to reduce lane marker overlap, and identify a subset of the candidate instances. That is, the initial aggregation may result in two lane marker instances being generated for the same lane marker (e.g., for adjacent patches in the input image 105). The aggregation component 140 can therefore apply one or more operations to identify a set of actual lane markers. For example, the aggregation component 140 may apply one or more non-maximum suppression (NMS) techniques based on the localization score of each lane marker instance and/or the distance between instances (e.g., the average horizontal distance between overlapping regions of the instances), such as by retaining the instance with the highest localization score and rejecting others in a greedy fashion (e.g., iteratively rejecting the lane marker(s) with the lowest localization score, as discussed in more detail below).

Additionally, in some aspects, optional post processing may be used, such as application of a random sample consensus (RANSAC) technique to fit a polynomial curve to the vertices of each lane marker instance 145. The vertices can then be resampled based on this curve, in order to return a lane marker instance aligned with the curve. For example, if the system fits the vertices using a polynomial curve, the resampling may include generating or selecting new points (e.g., new vertices) along the fitted curve.

In aspects, the lane marker instances 145 can be used in a variety of ways. For example, the system may use the lane marker instances 145 internally to provide self-driving or driver-assist (e.g., to control steering of the car). In the illustrated example, the lane marker instances 145 have been used to overlay an indication of the detected lanes on the input image 105 by placing dotted lines 150 over the corresponding vertices indicated by the lane marker instances 145. This can allow the instances to be visualized, as well as be used to identify or indicate the ego lane 155 (the lane in which the vehicle 107 is currently located).

Example Workflow for Lane Marker Detection Using Machine Learning

Figure 2:
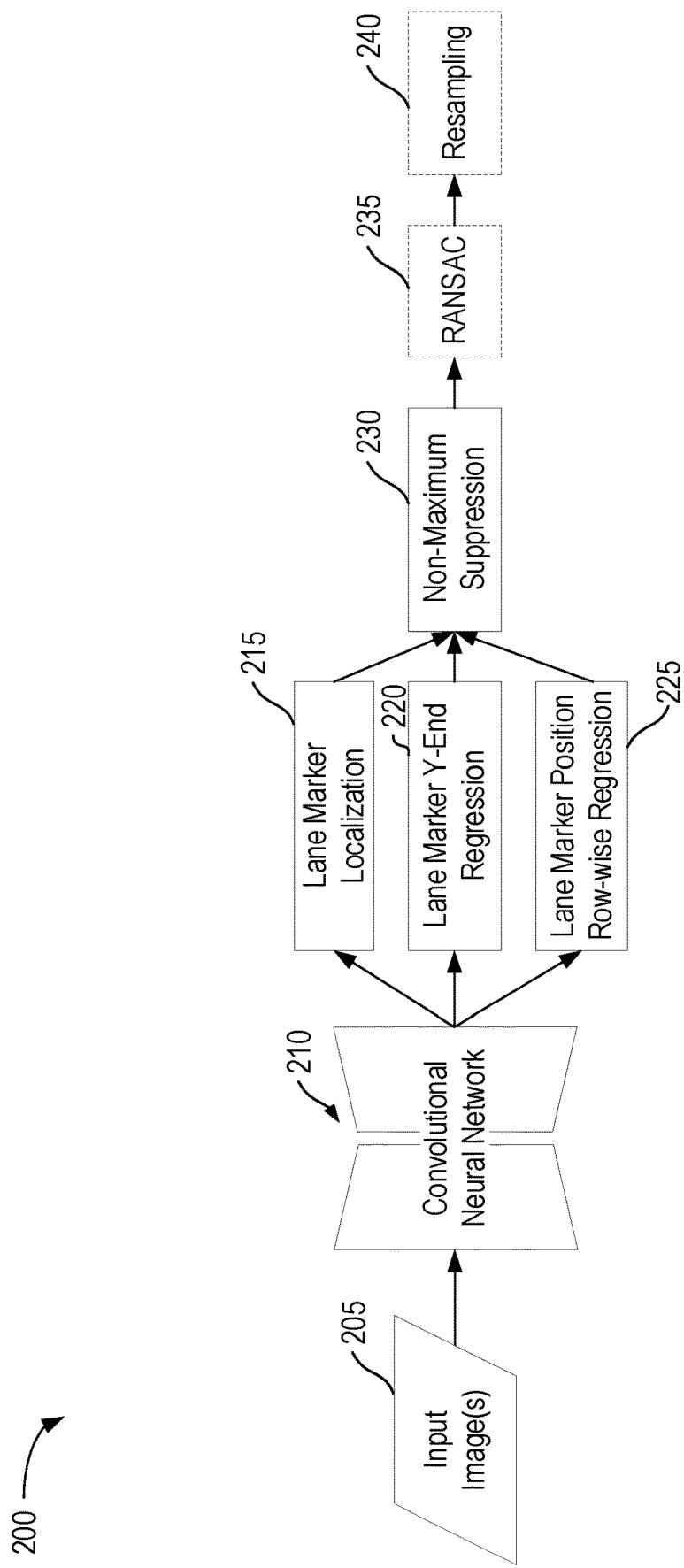
FIG. 2 depicts an example workflow for lane marker detection using machine learning.

FIG. 2 depicts an example workflow 200 for lane marker detection using machine learning. The workflow 200 may be performed by a variety of devices or systems, such as the lane detection system 115 of FIG. 1.

In the illustrated workflow, input image(s) 205 are provided to a convolutional neural network 210. In an aspect, the convolutional neural network 210 is trained or configured to extract features of the input images 205. In at least one aspect, the convolutional neural network 210 may correspond to the feature component 120 of FIG. 1.

As illustrated, the output from the convolutional neural network 210 (e.g., the set of features or feature tensor(s)) are then processed by a variety of operations, including lane marker localization 215, lane marker y-end regression 220, and lane marker position row-wise regression 225. In at least one aspect, the lane marker localization 215 may correspond to the localization component 125 of FIG. 1, the lane marker y-end regression 220 may correspond to the y-end component 130 of FIG. 1, and the lane marker position row-wise regression 225 may correspond to the row-wise component 135 of FIG. 1.

In one aspect, the lane marker localization 215 generates a localization tensor indicating, for each patch of the input images 205, whether the patch corresponds to the center (or other predefined portion) of a lane marker in the image. In some aspects, this indication corresponds to a probability that the patch includes the center of the marker. To do so, the lane marker localization 215 may be trained based on labeled exemplars (e.g., images of lane markers, with labels indicating one or more positions on each marker as the ground truth). In at least one aspect, the lane marker localization 215 is trained using the center position of each lane marker as the ground truth instance location.

As lane markers are often relatively elongated (e.g., much longer than they are wide), in some aspects, use of additional supervision on the end position(s) of the lane markers can improve the accuracy of the model (as opposed to only indicating the center of the lane marker). In some aspects, therefore, the training exemplars indicate the center position, as well as one or both ends of the marker. Additionally, in some aspects, one or more ground truth positions may also be included to aid in the handling of split and merge cases. For example, the exemplars may include labels (e.g., indicating whether there is an adjacent marker) at some defined offset to the left and right of the center position. This may help the lane marker localization 215 learn to recognize lane markers that are diverging or merging.

In one aspect, the lane marker y-end regression 220 generates an end position tensor indicating the vertical positions of the end(s) of each lane marker in the input image 205. For example, if a given pixels or vertex at the end of a lane marker is located at (x, y) in the image (where (0,0)

is the upper-left corner, the first coordinate indicates the horizontal location, and the second indicates the vertical location), the y-end regression 220 may be used to generate the "y" coordinate of the end(s). In some aspects, as discussed above, the lane marker y-end regression 220 can be trained based on labeled exemplars (e.g., a set of images, each with a ground truth label indicating the ends of each lane marker). In some aspects, the particular annotation form used for the lane markers during training may vary. For example, in some aspects, a set of vertices forming the lane markers (along the center of lane marker) can be used. From these annotations, the system can extract the relevant information for each portion of the model (e.g., extracting the start and end "y" values in the vertices for the y-end branch), and the like.

Additionally, in one aspect, the lane marker position row-wise regression 225 generates a horizontal position tensor indicating the horizontal positions (e.g., positions in the horizontal direction of the image, or the "x" position) of each lane marker in the input image 205 (e.g. indicating the horizontal lane marker position at each y-coordinate in the image). In some aspects, as discussed above, the lane marker position row-wise regression 225 can be trained based on labeled exemplars (e.g., a set of images, each with a ground truth label indicating the lane markers, or a set of vertices, as discussed above).

In the illustrated workflow 200, the resulting tensors output by the lane marker localization 215, lane marker y-end regression 220, and lane marker position row-wise regression 225 are combined (prior to non-maximum suppression 230) to generate lane instances, where each instance indicates a set of vertices that correspond to the detected lane.

For example, in some aspects, the lane marker localizations are represented via a tensor having dimensionality of 2×H×W, where H is the number of patches in the vertical dimension of the input image and W is the number of patches in the horizontal direction. The first dimension of the localizations tensor may be used to represent on/off for the corresponding patch at the h-th and w-th positions in the image (e.g., indicating whether the patch includes a lane marker, and/or a probability of the lane marker's existence for the patch). In some aspects, using a depth of two, the localizations define a categorical distribution for each patch, and one or more operations (e.g., a softmax operation) are used to determine the on/off probabilities for the patch. In at least one aspect, the localization tensor has dimensionality 1×H×W, where the first dimension can be a binary or continuous value indicating the presence (or probability of presence) of a lane marker.

Similarly, in some aspects, the lane marker end positions are represented using a tensor having dimensionality 2×H×W, where the first dimension is used to indicate the top and bottom end positions of the lane marker(s).

Further, in some aspects, the lane marker horizontal positions are represented using a tensor having dimensionality of $$HW \times \frac{Y}{2} \times 1,$$

where Y is the height of the input image 205 in pixels. In at least one aspect, the first dimension has a size of HW so as to include a value for each patch in the input, and the second dimension has size $$\frac{Y}{2}.$$

In some aspects, the size of the second dimension is a design choice and may differ (or may match the original input size Y). In some aspects, this dimension size may be reduced so as to reduce computational complexities. In at least one aspect, after generating the output, it can be multiplied appropriately (e.g., by 2 in this example) to retrieve the true outcome in the same dimensionality as the input.

In one aspect, for a given lane marker instance localization in the localization tensor (e.g., the index of a patch with a sufficiently high confidence or probability of including a lane marker), the aggregation component 140 can directly index the corresponding position in the end position tensor and the end position tensor. For example, the system (e.g., the aggregation component 140 of FIG. 1) may identify a set of indices in the spatial dimensions (e.g., in the H×W dimensions) in the localization tensor with values exceeding a defined threshold. These indices can then be directly used to get the corresponding values at the same indices in the end position tensor (which has the same spatial dimensionality, in some aspects).

Additionally, as the row-wise or horizontal position tensor has a size of HW in the first dimension, the aggregation component can also get the corresponding horizontal position by indexing in the row-wise tensor. In one aspect given an index (h, w) of a patch having the center of a lane marker, the system can identify the corresponding index in the row-wise output according to: $index_{row\text{-}wise} = index_{X,local} * W + index_{y,local}$, where $index_{row\text{-}wise}$ is the corresponding row-wise index, $index_{X,local}$ is the x-index of the patch in the localization tensor, and $index_{y,local}$ is the y-index of the patch in the localization tensor.

For example, suppose the grid size is twelve by thirty-two (e.g., there are 12 patches in the vertical direction, and 32 in the horizontal direction). If the patch located at index (3,7) is identified as having a lane marker, then the system can identify the corresponding index in the row-wise tensor as the $103^{rd}$ position in the first dimension (using the equation above).

As discussed above, however, there may be significant overlap in these instances (e.g., a single lane marker may be detected multiple times). As illustrated, therefore, the instances may be processed using NMS 230, as discussed above.

The NMS 230 generally uses one or more techniques to select the lane marker instance that is most accurate or best (e.g., based on the localization scores) and to discard the overlapping instances that correspond to the selected instance. In the illustrated workflow 200, these final lane instances may optionally be processed using a RANSAC process 235 to fit a curve to the set of vertices, as discussed above. In some aspects, this may help smooth out irregularities or noise in the lanes. Following the RANSAC 235, the fitted curves are used to perform resampling 240 of the vertices, resulting in a smooth line of vertices representing each lane marker.

Example Model Architecture for Lane Marker Detection Using Machine Learning

Figure 3:
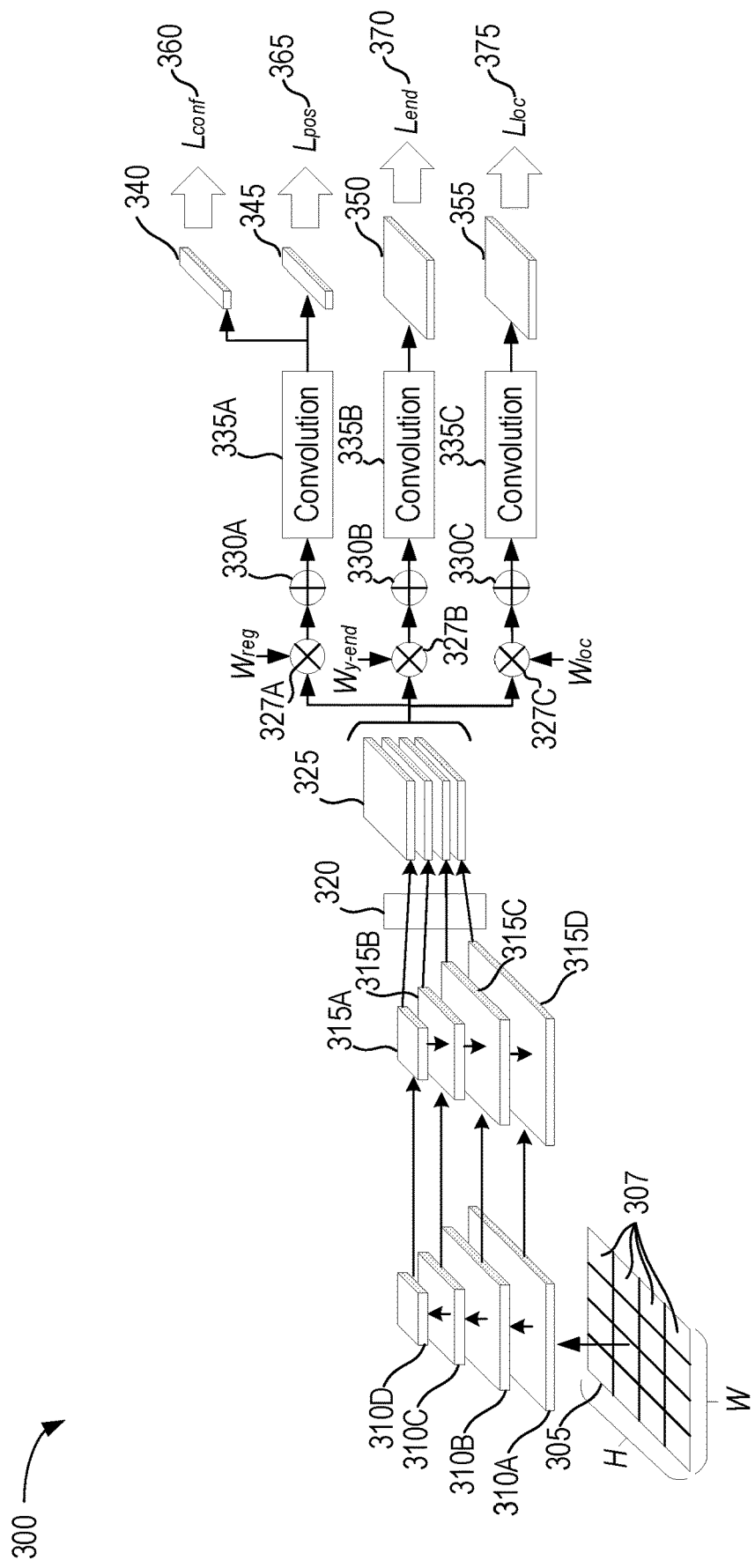
FIG. 3 depicts an example model architecture for lane marker detection using machine learning.

FIG. 3 depicts an example model architecture 300 for lane marker detection using machine learning. The architecture 300 may be used by a variety of devices or systems, such as the lane detection system 115 of FIG. 1. In some aspects, the architecture 300 provides additional detail for one implementation of the workflow 200 of FIG. 2.

An input image 305 is provided to the architecture 300 for processing. In the illustrated aspect, the image 305 has spatial dimensionality of H×W (e.g., a height of H and a width of W elements or pixels). Although the depicted input does not have a depth (e.g., has a single channel), in various aspects, the input image 305 may have any channel depth (e.g., the image 305 may be greyscale, black and white, full color, and the like). As illustrated, the image 305 is delineated into a set of grid cells 307 (also referred to in some aspects as patches or regions) in a grid. Although the illustrated example depicts the image 305 delineated into four patches in each direction, there may be any number of patches in the image 305. For example, if the input image is 192 pixels by 512 pixels, and the architecture 300 uses a 16-pixel grid (e.g., where each patch is a 16×16 pixel square), then the image 305 can be delineated into a set of 384 patches (12 patches tall and 32 patches wide). In one aspect, some or all of the lane marker localization and identification is provided on a per-grid basis. For example, in one aspect, if the center of a lane marker falls in a particular grid cell 307, then that grid cell 307 is tasked with identifying or providing the localization of the lane marker, as discussed below in more detail.

In the illustrated example, the architecture 300 uses a feature pyramid network (FPN) for feature extraction (e.g., to act as the feature component 120 of FIG. 1, or the convolutional neural network 210 of FIG. 2). The feature pyramid network generally has two components: a backbone portion (also referred to as an encoder or a bottom-up pathway in some aspects), represented by the layers 310A-D, and a feature pyramid portion (also referred to as a decoder or top-down pathway in some aspects), represented by layers 315A-D.

In the bottom-up pathway, each layer 310 is used to generate a feature map based on corresponding input, where the input to each layer 310 is the output from the prior layer 310 (except for the first layer 310A, which uses the image 305 as input). As illustrated, each layer 310 is successively smaller than the prior layer 310. For example, if a scaling step of two is used, then each layer is half the size of the prior layer. In the illustrated example, if the layer 310A evaluates its input (e.g., using one or more convolution operations) at a size of N×M, then the output feature tensor is downsampled by two and the layer 310B evaluates it (e.g., using one or more convolution operations) at size $$\frac{N}{2} \times \frac{M}{2}.$$

Generally, any scaling factor can be used, and may be a predefined or dynamic value. Additionally, although the illustrated example includes four layers 310A-D, there may be any number of layers 310 in various aspects. Generally, by evaluating the data at various scales (with the spatial resolution decreasing at each layer 310), the architecture 300 is able to identify more high-level structures in some aspects.

In the illustrated aspect, the top-down pathway similarly includes a number of layers 315A-D, each evaluating the data (e.g., using one or more convolution operations) at successively higher resolutions. In some aspects, the tensors are iteratively upsampled (e.g., with a scaling step of two) and, at each layer 315, the tensor from the corresponding layer 310 is aggregated or concatenated with the tensor in the layer 315 (as illustrated by the lateral connections). For example, for the layer 315C, the data output by the layer 315B may be upsampled, and the data output by the layer 310B may be concatenated with this upsampled data. In some aspects, the data in the lateral connection, output by the corresponding layer 310, may undergo one or more convolution operations (e.g., a pointwise convolution) prior to the concatenation. These lateral connections can improve the spatial sensitivity of the architecture 300.

As illustrated, the output from each layer 315 can undergo an additional convolution operation 320 to yield a set or stack of tensors 325. That is, the output from the layer 315A can undergo a convolution operation 320 to yield the uppermost tensor in the set of tensors 325, the output from layer 315B is processed using a convolution operation 320 to yield the next tensor, and so on. In at least one aspect, the convolution operation 320 is a coordinate convolution (e.g., CoordConv) that concatenates one or more additional channels prior to convolution, where these additional channels are hardcoded to indicate the coordinates of the data at any given point. This can improve spatial awareness of the convolution operation 320.

Generally, the coordinate convolution operation 320 is used to transform the output of each layer 315 to a specific dimensionality. In at least one aspect, the coordinate convolution operation 320 can include changing the size of the tensors using convolution(s) and bilinear upsampling until the tensor 325 reaches a specific scale (e.g., ¼), as compared to the original input image 305. For example, to go from a ¹⁄₃₂ scale (in the uppermost layer 315A) to a ¼ scale, the convolution operation 320 may include a first convolution, followed by upsampling by a factor of 2, followed by a second convolution operation and another upsampling by a factor of two, and finally followed by a third convolution and another upsampling by a factor of two. For the bottom-most layer 315D (or some layer that is already at the desired scale) the convolution operation 320 may include a single convolution with no upsampling.

Although the illustrated example includes use of a tensor from the lowest level of the feature pyramid (e.g., from the layer 315D) in the tensors 325, in some aspects, the output from this first (deepest) level of the pyramid is not used to form the tensors 325. That is, the system may use the output starting at the $2^{nd}$ level (e.g., at layer 315C, and including layers 315B and 315A), as the lowest level may not improve performance or accuracy of the architecture 300.

As illustrated, the resulting tensors 325 are then combined by a corresponding element-wise summation 330A-C for each branch of the architecture 300. In the illustrated example, this summation 330 is weighted based on a set of task variant weights that are learned during training. Specifically, the localization branch uses a set of weights $W_{loc}$ to weight the tensors 325 (via operation 327C) prior to the summation 330C of the tensors 325, the y-end branch uses a set of weights $W_{y-end}$ to weight the tensors 325 (via operation 327B) prior to the summation 330B of the tensors 325, and the row-wise regression branch uses a set of weights $W_{reg}$ to weight the tensors 325 (via operation 327A) prior to the summation 330A of the tensors 325. In an aspect, the weights are used to compute a weighted sum of the tensors 325. That is, each set of weights W can specify a weight for each of the tensors 325 (e.g., with a first weight for the top-most tensor from layer 315A, and a second weight for the next tensor from layer 315B).

In an aspect, each of the weighted summations 330A-C yields a single corresponding tensor at the same scale as the tensors 325 (e.g., ¼ scale). In one aspect, all or some of the individual branches can use this ¼ scale tensor. In at least one aspect, the localization head uses the ¼ scale tensor, while the regression heads (e.g., the row-wise regression and the y-end regression) upsample it to meet a target resolution (e.g., from ¼ scale to ½ scale). In at least one aspect, this upsampling is performed just before an activation function in the corresponding branch to reduce complexity.

In the illustrated example, a convolution 335C is used to provide the localization (e.g., to generate a set of lane localizations), resulting in a tensor 355. In at least one aspect, as discussed above, the lane marker localizations are represented via a tensor 355 having dimensionality of 2×H×W, where H is the number of grid cells 307 in the vertical dimension of the input image 305 and W is the number of grid cells 307 in the horizontal direction. In at least one aspect, the convolution 335C is used to transform the output of the summation 330C to the desired dimensionality of the localization tensor 355. For example, the convolution 335C may include a 1×1 pointwise convolution. In some aspects, after convolution 335C, the localization branch may include a softmax function on the first dimension of the tensor 355 to determine a probability of each localization, as discussed above. In some aspects, if the first dimension has a depth of one (e.g., including a continuous or binary value), a sigmoid function can be used to generate the probability.

In an aspect, the localization tensor 355 generally indicates, for each grid cell 307 in the input image 305, whether the cell includes the center point of a lane marker. In aspects, this may be a binary value, a continuous value (e.g., indicating the probability or likelihood that the cell contains the center of a lane marker), or both. For example, in one aspect, the value at a given index in the spatial dimensions (e.g., (h, w)) can indicate the probability that the cell at (h, w) in the input image 305 contains a lane marker.

As illustrated, during training, the localization tensor 355 is used to compute a localization loss 375 (designated $L_{loc}$). In at least one aspect, the localization loss 375 is a cross-entropy loss computed by comparing the generated localization tensor 355 with a ground-truth label. In other aspects, the localization loss 375 may use different formulations, such as focal loss (which may perform well when there is domain imbalance, such as when the background class (e.g., areas with no lane markers) is much more common than areas that include lane markers. In some aspects, as discussed above, the system uses multiple ground truth points for each lane marker. For example, in addition to the center point, the label may also indicate the position of one or both ends of the marker.

During training, an exemplar input image can be provided to the architecture 300, resulting in a localization tensor 355 indicating the location(s) of one or more portions of lane markers in the image. The ground-truth label indicating the actual positions in the input image can then be used to compute the localization loss 375 (e.g., by comparing the label to the generated tensor 355). The localization loss 375 can then be used to refine one or more parameters of the architecture 300, such as the parameters of the convolution 335C, the convolution operation 320, the layers 315A-D and/or layers 310A-D, the localization weighting $W_{loc}$, and the like.

In the illustrated example, a convolution 335B is used to provide the y-end data (e.g., to generate a set of end positions), resulting in a tensor 350. In at least one aspect, as discussed above, the lane marker end positions are represented via a tensor 350 having dimensionality of 2×H×W, where H is the number of grid cells 307 in the vertical dimension of the input image 305 and W is the number of grid cells 307 in the horizontal direction. In at least one aspect, the convolution 335B is used to transform the output of the summation 330B to the desired dimensionality of the end position tensor 350. For example, the convolution 335B may include a 1×1 pointwise convolution.

In some aspects, following this convolution, the end position head of the architecture 300 uses an exponential activation function to ensure the output is positive. In at least one aspect, the output is limited or scaled to meet a target range (e.g., corresponding to the dimensionality of the image 305) after this exponential operation.

In an aspect, the end position tensor 350 generally indicates, for each grid cell 307 in the input image 305, they coordinate(s) of the end point(s) of a lane marker that has its center in the cell 307 (if one exists). That is, in one aspect, at a given index in the spatial dimensions (e.g., (h, w)), the corresponding value(s) can indicate the y-end positions of the lane marker centered in that cell at (h, w). For example, suppose the localization at patch (3, 4) is above some predefined threshold (indicating a probability that the patch contains the center of a lane marker). In an aspect, the system can retrieve the values at (0, 3, 4) and (1, 3, 4) in the end position tensor 350, where the value at (0, 3, 4) indicates the y-coordinate of one end of the lane marker, and (1, 3, 4) indicates the y-coordinate of the other end.

As illustrated, during training, the end position tensor 350 is used to compute an end-position loss 370 (designated $L_{end}$). In some aspects, to ensure the regression converges rapidly, the system initializes the y-end regression with a bias of zero and a target height equal to half of the original image height, as discussed above.

In at least one aspect, the end position loss 370 is a smooth L1 loss computed by comparing the generated end position tensor 350 with a ground-truth label, as discussed above. For example, during training, an exemplar input image can be provided to the architecture 300, resulting in an end-position tensor 350 indicating the location(s) of the ends of one or more lane markers in the image. During training, the ground-truth label indicating the actual end positions in the input image is used to compute the end position loss 370 (by comparing the ground truth positions to the generated positions). This loss can then be used to refine one or more parameters of the architecture 300, such as the parameters of the convolution 335B, the convolution operation 320, the layers 315A-D and/or layers 310A-D, the y-end weighting $W_{y-end}$, and the like.

In the illustrated example, a convolution 335A is used to provide the row-wise data (e.g., to generate a set of horizontal lane positions), resulting in a horizontal position tensor 345. In some aspects, the row-wise convolution head is also used to generate a confidence loss 360 based on a confidence tensor 340, as discussed in more detail below. In some aspects, to reduce the computational complexity of the model, the convolution 335A uses row-wise kernels (e.g., rectangular kernels with a size of one in the vertical direction).

In at least one aspect, as discussed above, the lane marker horizontal positions are represented via a tensor 345 having dimensionality of HW×$T_H$×1, where H is the number of grid cells 307 in the vertical dimension of the input image 305, W is the number of grid cells 307 in the horizontal direction, and $T_H$ is the target height of the tensor 345 (e.g., half the height of the original image, as discussed above). In at least one aspect, the convolution 335A is used to transform the output of the summation 330A to the desired dimensionality of the end position tensor 345. For example, the convolution 335B may include a 1×1 pointwise convolution. In one aspect, the first dimension of the tensor 345 is used index possible lane marker row-wise positions after identifying the lane marker instance candidates from the localization branch, as discussed above. In the second dimension of the tensor 345, after a softmax operation, the predicted x coordinate(s) of the lane marker(s) are indicated, for each row.

Additionally, in an aspect, the convolution 335A includes a row-wise convolution, as discussed above. Generally, the row-wise convolution is used to indicate the horizontal position of any lane markers in the image 305. In some aspects, during the row-wise regression, a series of horizontal reduction modules (HRMs) are used to progressively squeeze the horizontal direction of the input tensor while maintaining the vertical direction fixed.

In at least one aspect, the row-wise position head uses a softmax (also referred to as a soft-argmax in some aspects) function to return the row-wise lane marker position at a given y-position in the image. In one such aspect, the row-wise softmax operation is defined on a lane marker heat map or response map $h \in R^{W \times H}$ (which is generated using the convolution 335A) using equations 1 and 2, below, where $\phi$ is a row-wise softmax operation, $\psi$ is the tensor 345, W is an x-index vector (e.g., a vector with a length based on the input image's width, such as half the width, where the value at each respective index is equal to the respective index), $h_{x,y}$ is the heat map or response map value at pixel (x, y) in the input image.

$$\phi(h_{x,y}) = \frac{\exp(h_{x,y})}{\sum_{i=1}^{W} \exp(h_{i,y})} \quad (1)$$

$$\psi = \sum_{x=1}^{W} W_i \phi(h_{x,y}) \quad (2)$$

Using equations 1 and 2, the system can generate, for each pixel, a lane marker probability using the row-wise softmax operation, and the expected position(s), can be found by weighting these probabilities with x-index W. That is, rather than simply identifying the horizontal index having the highest probability for each row, the system can weight these probabilities by the indices (given in W) to determine the expected value of the marker (e.g., the expected x-coordinate).

In an aspect, the horizontal position tensor 345 generally indicates the horizontal position(s) (e.g., to the left and right) of any lane markers in the image. As illustrated, during training, the horizontal position tensor 345 is used to compute a regression loss 365 (designated $L_{pos}$). In at least one aspect, the horizontal position loss 365 is a smooth L1 loss computed by comparing the generated horizontal position tensor 345 with a ground-truth label, as discussed above. In other aspects, the system may use other losses, such as wing loss or Laplacian loss. In some aspects, if no lane marker exists at a given row position, then the position can be ignored when computing the loss.

In the illustrated example, the row-wise convolution 335A is also used to generate a confidence tensor 340. In an aspect, the confidence tensor 340 indicates a row-wise existence confidence (e.g., computed using a sigmoid function on the tensor generated by the convolution 335A), indicating a confidence or probability that a lane marker is actually present in the row. In the illustrated example, this confidence tensor 340 is used to compute a confidence loss 360 (designated $L_{conf}$). In such an aspect, the overall loss for the row-wise regression can be defined as $L_{reg}=L_{pos}+\lambda_{conf}L_{conf}$, where $\lambda_{conf}$ is the weight of the confidence loss 360. In some aspects, dice loss (which can effectively consider both local and global aspects of the data) is used to compute the confidence loss 360. In at least one aspect, this confidence branch can be used to provide additional supervision during training, but it can be removed after training.

This regression loss can then be used to refine one or more parameters of the architecture 300, such as the parameters of the convolution 335A, the convolution operation 320, the layers 315A-D and/or layers 310A-D, the regression weighting $W_{reg}$, and the like.

In at least one aspect, the overall loss for the architecture 300 is defined as: $L=L_{loc}+L_{reg}+\lambda_{end}L_{end}$, where $\lambda_{end}$ is the weight of the y-end loss 370.

After training is complete, in some aspects, the confidence branch can be discarded and the model architecture 300 can be used to generate, for a given input image 305, a localization tensor 355, end position tensor 350, and horizontal position tensor. As discussed above, these tensors can be used to generate lane instances for systems, such as ADAS systems.

Example Method for Training Machine Learning Models to Detect Lane Markers

Figure 4:
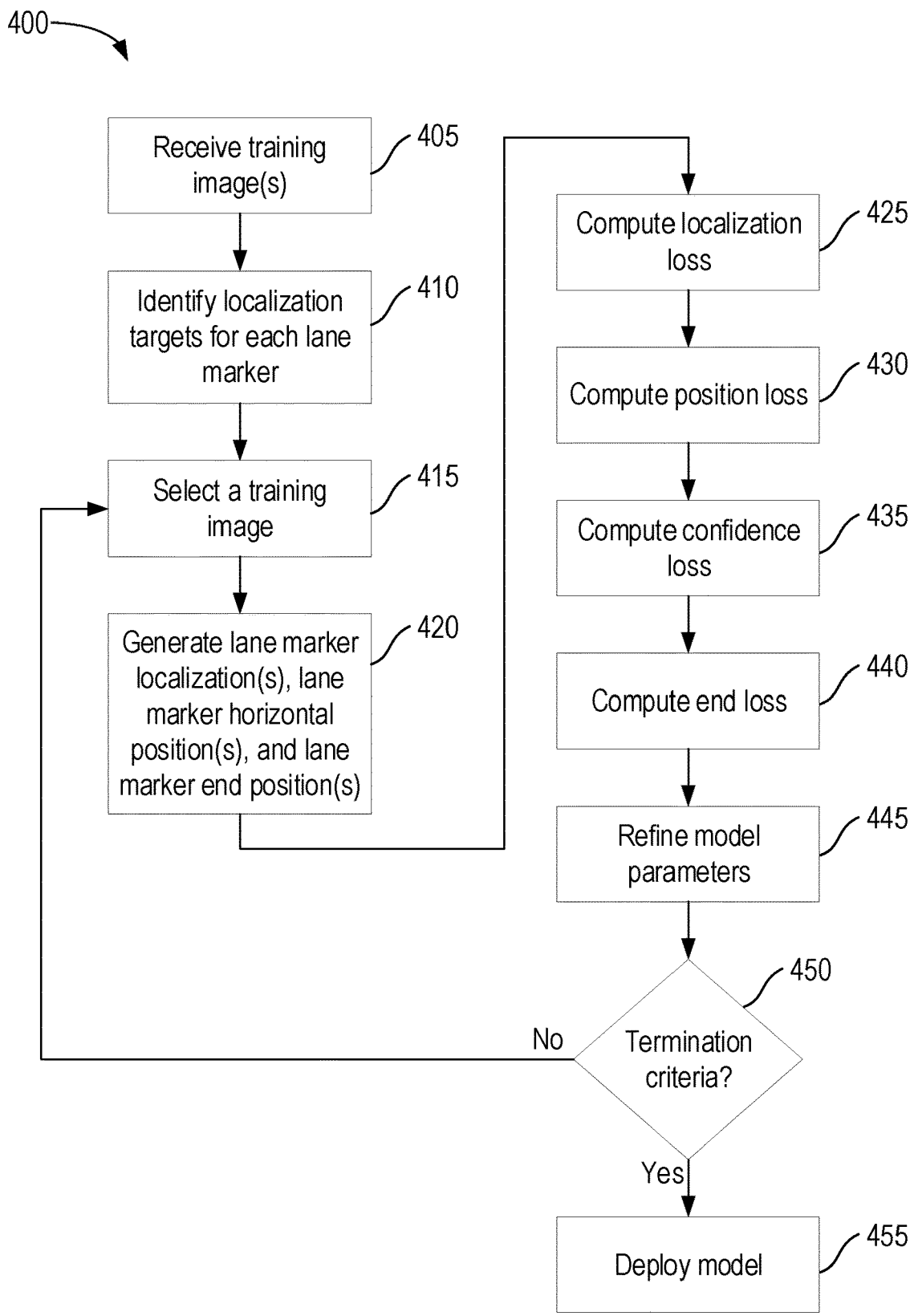
FIG. 4 depicts an example flow diagram illustrating a method for training machine learning models to detect lane markers.

FIG. 4 depicts an example flow diagram illustrating a method 400 for training machine learning models to detect lane markers. In some aspects, the method 400 is performed by a lane detection system, such as the lane detection system 115 of FIG. 1. In other aspects, the method 400 may be performed elsewhere (e.g., on a server or other computing system), and the trained models can be provided to the lane detection system.

The method 400 begins at block 405, where one or more training images are received by the lane detection system. As discussed above, each training image can generally depict a set of one or more lane markers. Additionally, each training image may be associated with a corresponding label indicating the ground truth locations of one or more parts of each lane marker.

At block 410, the lane detection system identifies a set of localization targets for each lane marker, as indicated in the corresponding labels. For example, as discussed above, the lane detection system may use the center position of each lane marker as the localization target. In some aspects, the lane detection system can also use one or more ends of the lane as a target, as discussed above, in order to improve localization of the lane markers during runtime.

At block 415, the lane detection system selects one of the received training images. In aspects, this selection may be performed according to any criteria, as all training images will be evaluated in turn. Additionally, though the illustrated example depicts evaluation of each training image in sequence (e.g., using stochastic gradient descent) for conceptual clarity, in some aspects, the system may train the model in batches (e.g., using batch gradient descent).

At block 420, the lane detection system generates a set of lane marker localizations, lane marker horizontal positions, and lane marker end positions for the selected training image, using the lane marker detection model (e.g., using the architecture 300 of FIG. 3). For example, as discussed above, the model may output a localization tensor indicating the center of each lane marker, a horizontal position tensor indicating the horizontal position of lane markers at each row of the input, and an end position tensor indicating the end position(s) of each marker.

At block 425, the lane detection system computes a localization loss (e.g., localization loss 375 of FIG. 3) for the model based on the localization tensor and the ground truth label of the selected input image. For example, as discussed above, the lane detection system may use a cross-entropy loss to compute the localization loss.

At block 430, the lane detection system computes a position loss (e.g., position loss 365 of FIG. 3) for the model based on the horizontal position tensor and the ground truth label of the selected input image. For example, as discussed above, the lane detection system may use a smooth L1 loss to compute the position loss.

At block 435, the lane detection system computes a confidence loss (e.g., confidence loss 360 of FIG. 3) for the model based on the confidence tensor and the ground truth label of the selected input image. For example, as discussed above, the lane detection system may use a dice loss to compute the confidence loss.

At block 440, the lane detection system computes an end loss (e.g., end loss 370 of FIG. 3) for the model based on the end position tensor and the ground truth label of the selected input image. For example, as discussed above, the lane detection system may use a smooth L1 loss to compute the end loss.

At block 445, the lane detection system can then refine one or more of the parameters of the lane detection model based on the above-computed losses. For example, using back-propagation, the lane detection system may refine the parameters of each convolution (e.g., from FIG. 3, the system can refine the parameters in the layers 310 and 315 of the feature pyramid network, in the convolution operation 320, in the convolutions 335, and the like), the weights used to aggregate the features for each branch of the model (e.g., the regression weights, y-end weights, and localization weights discussed above with reference to FIG. 3), and the like.

At block 450, the lane detection system can then determine whether one or more training termination criteria are satisfied. These criteria can vary, and can include aspects such as a maximum training time or number of epochs, a determination as to whether any training samples remain, and the like. If the termination criteria are not satisfied, then the method 400 returns to block 415.

If one or more termination criteria are satisfied, the method 400 terminates at block 455, where the lane detection model is deployed for use in runtime (e.g., to generate lane marker instances given input images).

Note that FIG. 4 is just one example of a method, and other methods including fewer, additional, or alternative steps are possible consistent with this disclosure.

Example Method for Generating Lane Marker Instances Uses Machine Learning

Figure 5:
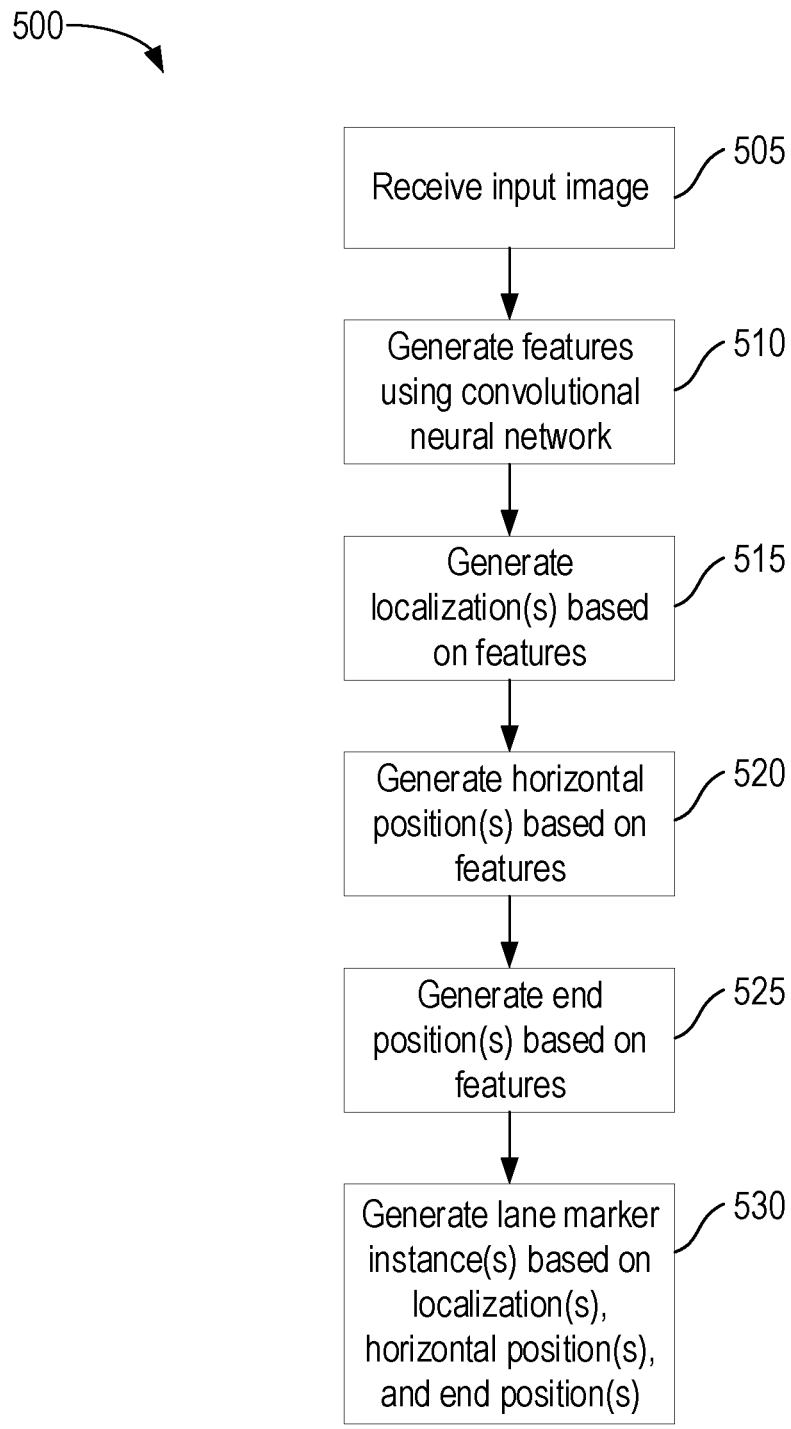
FIG. 5 depicts an example flow diagram illustrating a method for generating lane marker instances using machine learning.

FIG. 5 depicts an example flow diagram illustrating a method 500 for generating lane marker instances using machine learning. In some aspects, the method 500 is performed by a lane detection system, such as lane detection system of FIG. 1.

The method 500 begins at block 505, where the lane detection system receives an input image. For example, the input image may be captured by one or more imaging sensors on a vehicle (e.g., a self-driving vehicle or a vehicle including driver-assistance features). In aspects, the image may or may not depict any lane markers.

At block 510, the lane detection system generates a set of features (e.g., one or more feature tensors) by processing the input image using a convolutional neural network (e.g., using the convolutional neural network 210 of FIG. 2 or feature pyramid network of FIG. 3).

At block 515, the lane detection system generates a set of localizations (e.g., a localization tensor 355 of FIG. 3) based on the generated features. For example, as discussed above, the lane detection system may aggregate one or more of the feature tensors using a weighted summation, and process the aggregated features using one or more convolutions to set the dimensionality based on the input image (e.g., to set the spatial dimensions of the localization tensor based on the number of grid cells in the original input image). As discussed above, each index in the spatial dimensions of the localization tensor can generally indicate whether the corresponding grid cell, in the input image, depicts the center of a lane marker.

At block 520, the lane detection system generates a set of horizontal positions (e.g., a horizontal position tensor 345 of FIG. 3) based on the generated features. For example, as discussed above, the lane detection system may aggregate one or more of the feature tensors using a weighted summation, and process the aggregated features using a row-wise convolution process to squeeze the horizontal dimension of the input image and identify, for each y-position (e.g., each row) in the image, the horizontal position of any depicted lane markers. As discussed above, each index in the first dimension of the horizontal position tensor corresponds to a particular patch in the input image, where the values at each index indicate the horizontal position(s) of a lane marker (if present) that is centered at that patch. For example, the values N at [8, N,1] in the horizontal position tensor can indicate the row-wise positions (e.g., the x-coordinates) of the vertices of the lane marker that is centered at patch 8, where the size of that second dimension dictates the number of horizontal positions that can be provided. For example, if the size of the second dimension is the same as the height of the image, the horizontal position tensor may indicate the x-coordinate of the lane marker at each row of pixels in the image.

At block 525, the lane detection system generates a set of end positions (e.g., an end position tensor 350 of FIG. 3) based on the generated features. For example, as discussed above, the lane detection system may aggregate one or more of the feature tensors using a weighted summation, and process the aggregated features using one or more convolutions to regress the (h, w) position (e.g., the patch) of each end of each lane marker in the image. As discussed above, the indices of the localization tensor can be used to find the corresponding end positions in the end position tensor.

The method 500 can then continue to block 530, where the lane detection system generates a set of lane marker instances by aggregating the localizations, horizontal positions, and end positions, as discussed above. On example of aggregating the data to generate the lane marker instances is discussed below in more detail with reference to FIG. 6.

Note that FIG. 5 is just one example of a method, and other methods including fewer, additional, or alternative steps are possible consistent with this disclosure.

Figure 6:
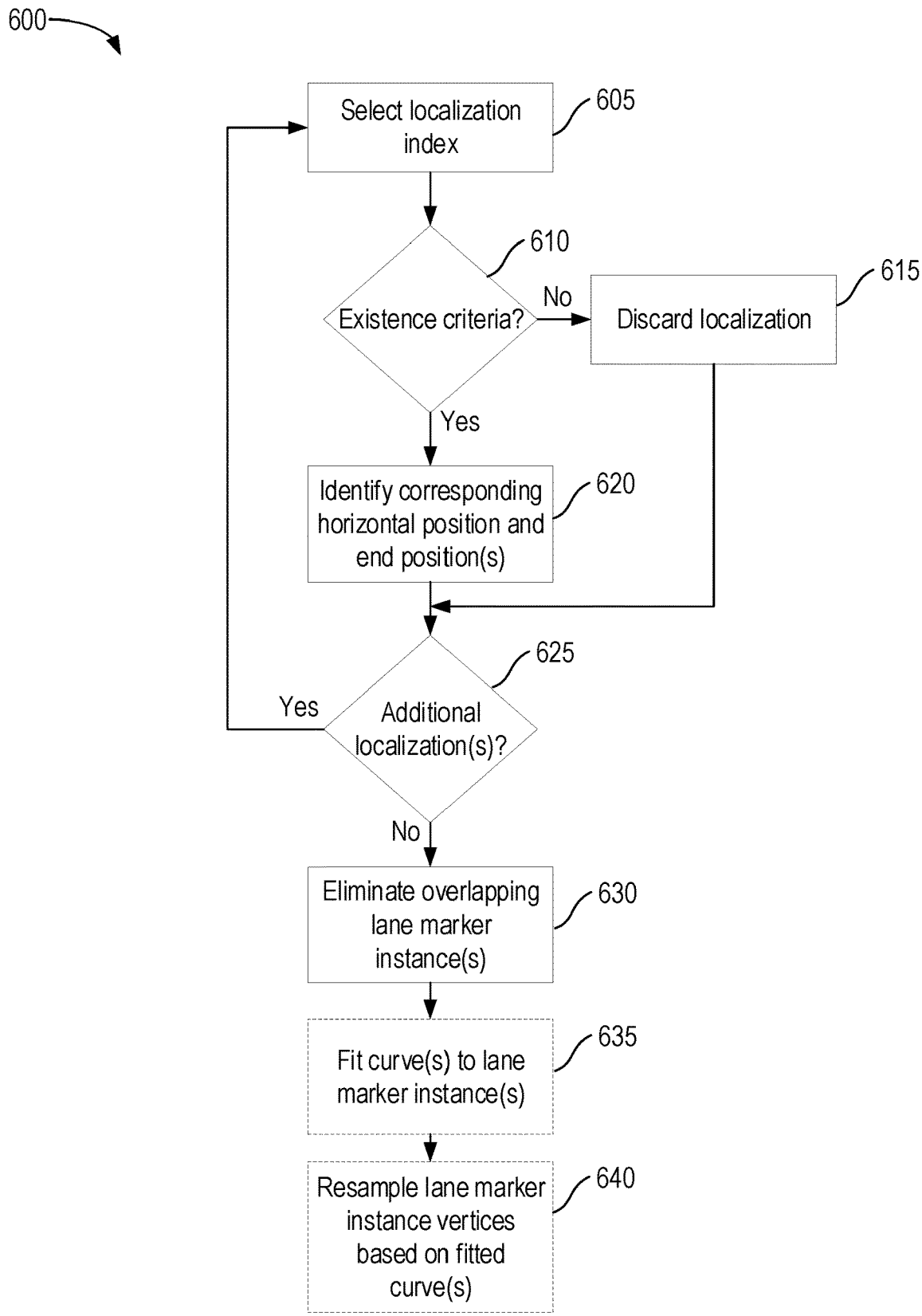
FIG. 6 depicts an example flow diagram illustrating a method for aggregating machine learning data to generate lane marker instances.

Example Method for Aggregating Machine Learning Data to Generate Lane Marker Instances FIG. 6 depicts an example flow diagram illustrating a method 600 for aggregating machine learning data to generate lane marker instances. In some aspects, the method 600 is performed by a lane detection system, such as the lane detection system 115 of FIG. 1. In one aspect, the method 600 provides additional detail for block 530 of FIG. 5.

The method 600 begins at block 605, where the lane detection system selects one of the indices in the generated localizations. In one aspect, selecting a localization corresponds to selecting an index in the spatial dimensions of the localization tensor, or selecting a grid cell in the input image (e.g., selecting an (h, w) pair). In an aspect, the particular technique used to select the localization can vary, as the system will iterate through all such localizations.

At block 610, the lane detection system determines whether the selected localization meets one or more defined existence criteria. For example, in some aspects, the value at each index in the localization tensor indicates whether it corresponds to a lane marker instance in the input image. In one such aspect, determining whether the selected index satisfies the criteria includes determining whether the corresponding value in the localization tensor indicates the presence of a lane marker, or whether it meets or exceeds some defined confidence or probability threshold.

If the selected localization does not meet the criteria, the method 600 continues to block 615, where the selected localization is discarded and the method 600 proceeds to block 625. That is, the lane detection system can determine or infer that the selected index is not the center of a lane marker (or that the selected localization is not sufficiently confident or probable). In an aspect, discarding the localization can include refraining from using it to generate the lane instances. That is, the lane detection system may generate a lane instance only for each localization that satisfies the defined thresholds or criteria, and the localizations that do not satisfy the criteria can be ignored, discarded, or otherwise not operated on when generating the instances.

Returning to block 610, if the lane detection system determines that the existence criteria are satisfied by the selected localization, then the method 600 continues to block 620, where the lane detection system generates a lane instance for the selected localization by identifying the corresponding horizontal position and end position(s) for the localization based at least in part on the index of the selected localization. The method 600 then continues to block 625.

At block 625, the lane detection system determines whether there is at least one additional localization (or index) that has not yet been evaluated. If so, then the method 600 returns to block 605. If all localization(s) have been evaluated, then the method 600 continues to block 630. Although the illustrated example depicts a sequential evaluation of each localization index for conceptual clarity, in various aspects, the lane detection system may evaluate localizations in other ways, including entirely or partially in parallel, to identify localizations that satisfy the defined criteria.

At block 630, the lane detection system eliminates overlapping lane marker instances (if present). In one aspect, this corresponds to NMS 230 in FIG. 2. For example, using one or more NMS techniques, the lane detection system can identify overlapping instances based on distances between each instance (e.g., in the horizontal direction), and select one localization (e.g., the one having the highest localization score) by rejecting the other overlapping instances in a greedy fashion. In this way, the system can generate a set of output lane marker instances. In some aspects, each lane marker instance indicates a set of vertices in the input image (e.g., a set of (x,y) coordinate pairs) belonging to the lane marker.

At block 635, the lane detection system can optionally fit one or more curves (e.g., polynomial curves) to each of the lane marker instances. For example, as discussed above with reference to the RANSAC 235, the system may use random sample consensus to fit polynomial curves to the lane marker instances, enabling the lanes themselves to be defined using smooth curves.

At block 640, the lane detection system may then optionally resample the lane marker instance vertices based on these fitted curves. For example, the lane detection system may add new vertices to the lane marker instance (e.g., adding vertices that are on the fitted curve but were not originally associated with the instance), remove vertices from the lane marker instance (e.g., removing vertices that were included in the lane marker instance but that are not on the fitted curve), and the like.

Note that FIG. 6 is just one example of a method, and other methods including fewer, additional, or alternative steps are possible consistent with this disclosure.

Example Method for Detecting Lane Markers

Figure 7:
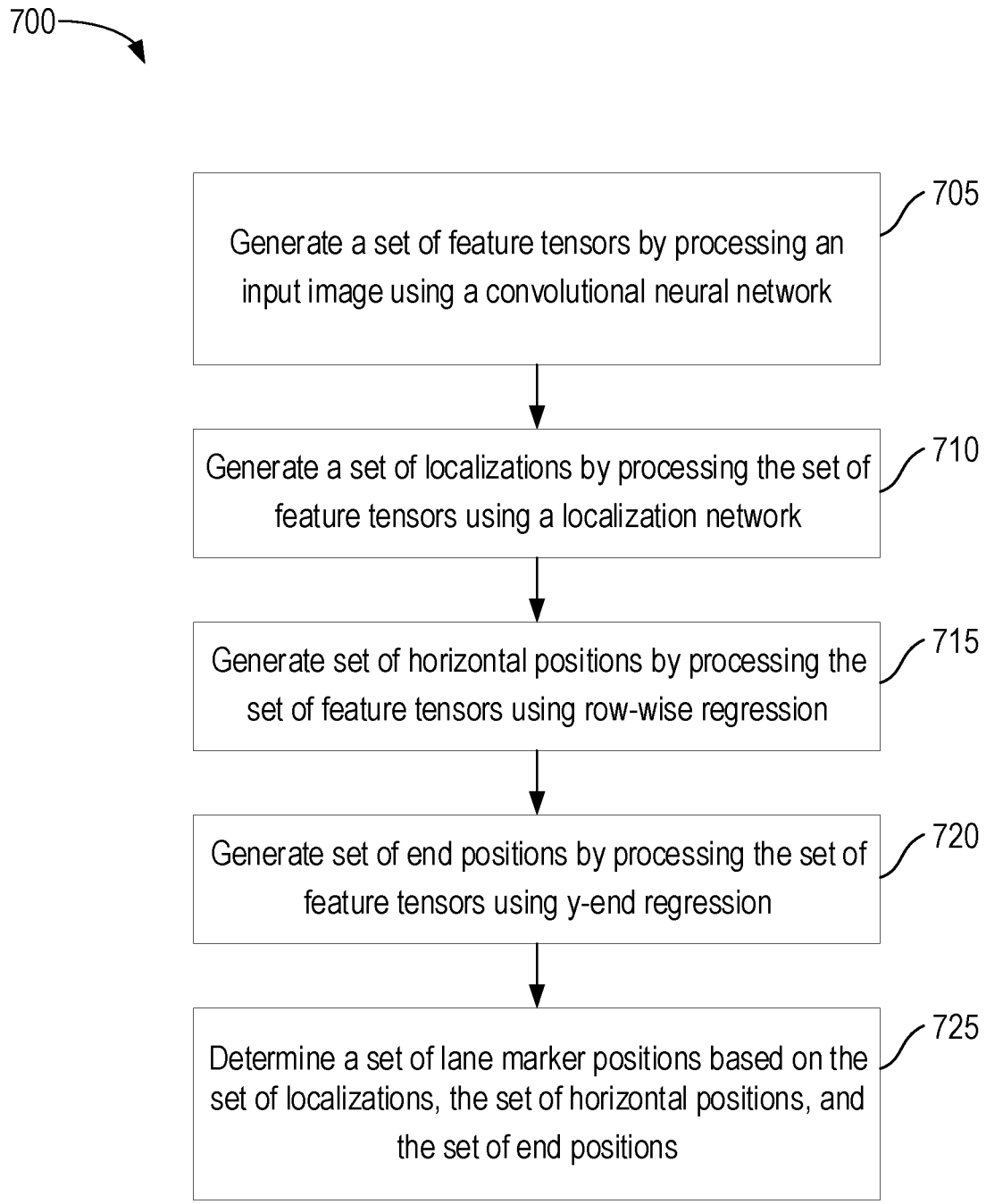
FIG. 7 depicts an example flow diagram illustrating a method for detecting lane markers.

FIG. 7 depicts an example flow diagram illustrating a method 700 for detecting lane markers. In some aspects, the method 700 may be performed by a lane marker detection system, such as lane marker detection system 115 of FIG. 1.

At block 705, a set of feature tensors is generated by processing an input image using a convolutional neural network (where the input image may include one or more lane markers).

At block 710, a set of localizations is generated by processing the set of feature tensors using a localization network.

In some aspects, training the localization network comprises computing a cross-entropy loss based on output of the localization network and a ground-truth location of one or more lane markers, wherein the ground-truth location comprises a center point and at least one end point.

At block 715, a set of horizontal positions is generated by processing the set of feature tensors using row-wise regression.

In some aspects, the row-wise regression comprises a softmax function, and wherein training the row-wise regression comprises computing a smooth L1 loss based on output of the softmax function of the row-wise regression.

In some aspects, training the row-wise regression further comprises computing a confidence loss using a dice loss function.

At block 720, a set of end positions is generated by processing the set of feature tensors using y-end regression.

In some aspects, the y-end regression comprises an exponential function, and wherein training the y-end regression comprises computing a smooth L1 loss based on output of the exponential function of the y-end regression.

In some aspects, the convolutional neural network is a feature pyramid network comprising a bottom-up pathway and a top-down pathway connected by one or more lateral connections; and prior to generating the set of localizations, the set of horizontal positions, and the set of end positions, the set of feature tensors are aggregated using a set of learned weights.

In some aspects, wherein the set of learned weights comprise: a first weight corresponding to the localization network; a second weight corresponding to the row-wise regression; and a third weight corresponding to the y-end regression.

At block 725, a set of lane marker positions is determined based on the set of localizations, the set of horizontal positions, and the set of end positions.

In some aspects, determining the set of lane marker positions comprises: identifying a first subset of localization positions, from the set of localizations that exceeds a defined threshold; and for each respective localization of the first subset of localization positions, selecting a corresponding horizontal position of the set of horizontal positions based on a respective end position of the set of end positions.

In some aspects, determining the set of lane marker positions comprises selecting a second subset from the first subset of localization positions using non-maximum suppression based on distance between respective localizations in the first subset of localization positions, wherein the distance is defined based on horizontal distance between overlapping regions.

In some aspects, the method 700 further comprises: applying a random sample consensus (RANSAC) technique to the set of lane marker positions; and fitting the set of lane marker positions to one or more polynomial curves.

Note that FIG. 7 is just one example of a method, and other methods including fewer, additional, or alternative steps are possible consistent with this disclosure.

Example Processing System for Lane Marker Detection

Figure 8:
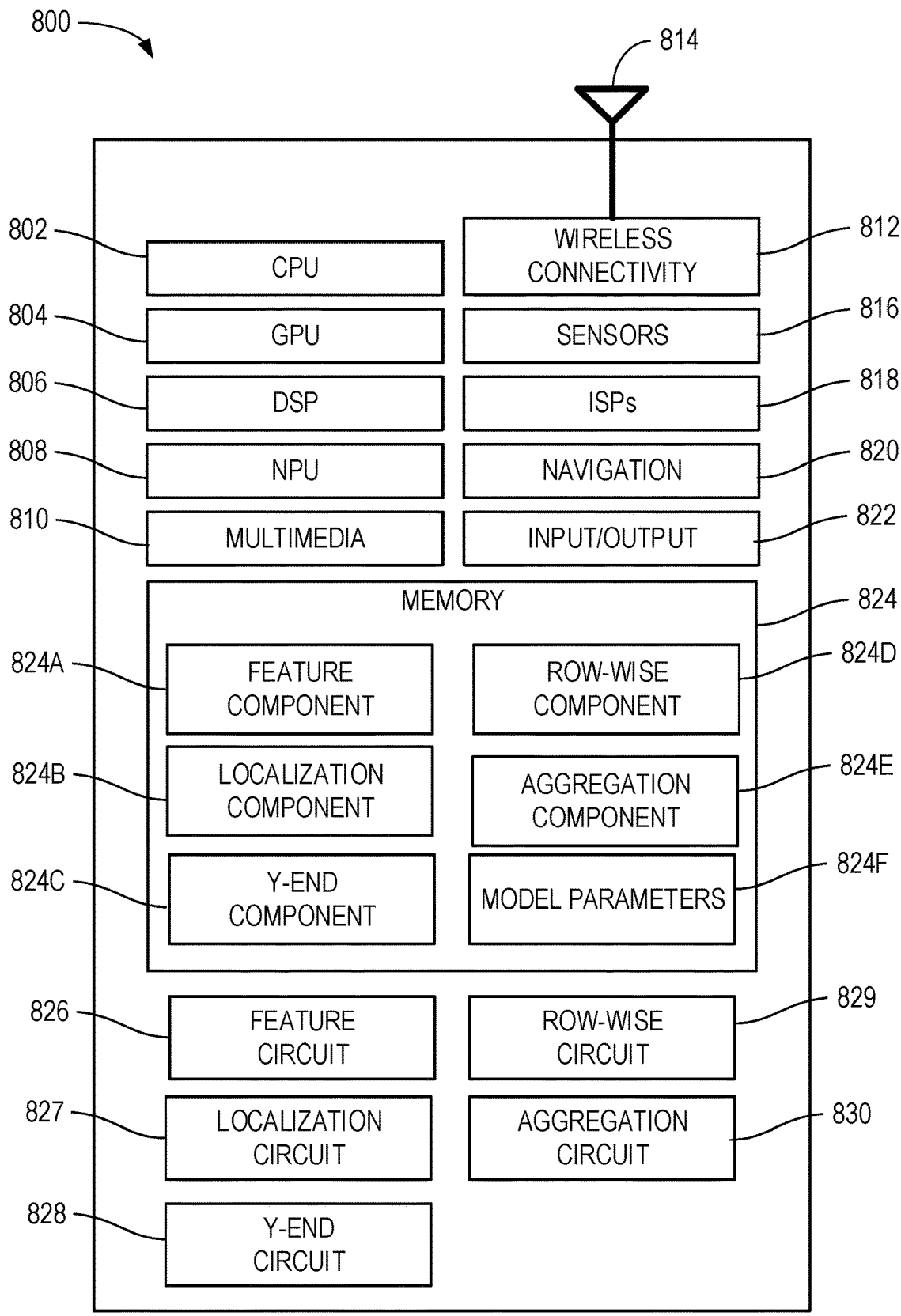
FIG. 8 depicts an example processing system configured to perform various aspects of the present disclosure.

In some aspects, the workflows, techniques, and methods described with reference to FIGS. 1-7 may be implemented on one or more devices or systems. FIG. 8 depicts an example processing system 800 configured to perform various aspects of the present disclosure, including, for example, the techniques and methods described with respect to FIGS. 1-7. In one aspect, the processing system 800 may correspond to the lane detection system 115 of FIG. 1.

Processing system 800 includes a central processing unit (CPU) 802, which in some examples may be a multi-core CPU. Instructions executed at the CPU 802 may be loaded, for example, from a program memory associated with the CPU 802 or may be loaded from a memory partition 824.

Processing system 800 also includes additional processing components tailored to specific functions, such as a graphics processing unit (GPU) 804, a digital signal processor (DSP) 806, a neural processing unit (NPU) 808, a multimedia processing unit 810, and a wireless connectivity component 812.

An NPU, such as 808, is generally a specialized circuit configured for implementing all the necessary control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPU), neural network processor (NNP), intelligence processing unit (IPU), vision processing unit (VPU), or graph processing unit.

NPUs, such as 808, are configured to accelerate the performance of common machine learning tasks, such as image classification, machine translation, object detection, and various other predictive models. In some examples, a plurality of NPUs may be instantiated on a single chip, such as a system on a chip (SoC), while in other examples they may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 808 is a part of one or more of CPU 802, GPU 804, and/or DSP 806.

In some examples, wireless connectivity component 812 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity processing component 812 is further connected to one or more antennas 814.

Processing system 800 may also include one or more sensor processing units 816 associated with any manner of sensor, one or more image signal processors (ISPs) 818 associated with any manner of image sensor, and/or a navigation processor 820, which may include satellite-based positioning system components (e.g., GPS or GLONASS) as well as inertial positioning system components.

Processing system 800 may also include one or more input and/or output devices 822, such as screens, touch-sensitive surfaces (including touch-sensitive displays), physical buttons, speakers, microphones, and the like.

In some examples, one or more of the processors of processing system 800 may be based on an ARM or RISC-V instruction set.

Processing system 800 also includes memory 824, which is representative of one or more static and/or dynamic memories, such as a dynamic random access memory, a flash-based static memory, and the like. In this example, memory 824 includes computer-executable components, which may be executed by one or more of the aforementioned processors of processing system 800.

In particular, in this example, memory 824 includes a feature component 824A (which may correspond to the feature component 120 in FIG. 1), a localization component 824B (which may correspond to the localization component 125 in FIG. 1), a y-end component 824C (which may correspond to the y-end component 130 in FIG. 1), a row-wise component 824D (which may correspond to the row-wise component 135 in FIG. 1), and an aggregation component 824E (which may correspond to the aggregation component 140 in FIG. 1). The memory 824 also includes a set of model parameters 824F (which may correspond to the parameters of the lane detection model discussed above, including the convolution weights at various stages, as well as the summation weights used to aggregate feature vectors). The depicted components, and others not depicted, may be configured to perform various aspects of the techniques described herein. Though depicted as discrete components for conceptual clarity in FIG. 8, feature component 824A, localization component 824B, y-end component 824C, row-wise component 824D, and aggregation component 824E may be collectively or individually implemented in various aspects.

Processing system 800 further comprises feature circuit 826, localization circuit 827, y-end circuit 828, row-wise circuit 829, and aggregation circuit 830. The depicted circuits, and others not depicted, may be configured to perform various aspects of the techniques described herein.

For example, feature component 824A and feature circuit 826 may be used to extract the features of the input images (e.g., using a convolutional neural network). Localization component 824B and localization circuit 827 may be used to provide localization data (e.g., localization tensors 355 in FIG. 3), as discussed above. Y-end component 824C and y-end circuit 828 may be used to provide end position data (e.g., end position tensors 350 in FIG. 3), as discussed above. Row-wise component 824D and row-wise circuit 829 may be used to provide row-wise position data (e.g., horizontal position tensors 345 in FIG. 3), as discussed above. Aggregation component 824E and aggregation circuit 830 may be used to generate lane instances based on the above-generated data, as discussed above.

Though depicted as separate components and circuits for clarity in FIG. 8, feature circuit 826, localization circuit 827, y-end circuit 828, row-wise circuit 829, and aggregation circuit 830 may collectively or individually be implemented in other processing devices of processing system 800, such as within CPU 802, GPU 804, DSP 806, NPU 808, and the like.

Generally, processing system 800 and/or components thereof may be configured to perform the methods described herein.

Notably, in other aspects, aspects of processing system 800 may be omitted, such as where processing system 800 is a server computer or the like. For example, multimedia component 810, wireless connectivity 812, sensors 816, ISPs 818, and/or navigation component 820 may be omitted in other aspects. Further, aspects of processing system 800 maybe distributed between multiple devices.

Example Clauses

Clause 1: A method, comprising: generating a set of feature tensors by processing an input image using a convolutional neural network; generating a set of localizations by processing the set of feature tensors using a localization network; generating set of horizontal positions by processing the set of feature tensors using row-wise regression; generating set of end positions by processing the set of feature tensors using y-end regression; and determining a set of lane marker positions based on the set of localizations, the set of horizontal positions, and the set of end positions.

Clause 2: The method according to Clause 1, wherein determining the set of lane marker positions comprises: identifying a first subset of localization positions, from the set of localizations that exceeds a defined threshold; and for each respective localization of the first subset of localization positions, selecting a corresponding horizontal position of the set of horizontal positions based on a respective end position of the set of end positions.

Clause 3: The method according to any one of Clauses 1-2, wherein determining the set of lane marker positions comprises: selecting a second subset from the first subset of localization positions using non-maximum suppression based on distance between respective localizations in the first subset of localization positions, wherein the distance is defined based on horizontal distance between overlapping regions.

Clause 4: The method according to any one of Clauses 1-3, further comprising: applying a random sample consensus (RANSAC) technique to the set of lane marker positions; and fitting the set of lane marker positions to one or more polynomial curves.

Clause 5: The method according to any one of Clauses 1-4, wherein: the convolutional neural network is a feature pyramid network comprising a bottom-up pathway and a top-down pathway connected by one or more lateral connections; and prior to generating the set of localizations, the set of horizontal positions, and the set of end positions, the set of feature tensors are aggregated using a set of learned weights.

Clause 6: The method according to any one of Clauses 1-5, wherein the set of learned weights comprise: a first weight corresponding to the localization network; a second weight corresponding to the row-wise regression; and a third weight corresponding to the y-end regression.

Clause 7: The method according to any one of Clauses 1-6, wherein training the localization network comprises computing a cross-entropy loss based on output of the localization network and a ground-truth location of one or more lane markers, wherein the ground-truth location comprises a center point and at least one end point.

Clause 8: The method according to any one of Clauses 1-7, wherein the row-wise regression comprises a softmax function, and wherein training the row-wise regression comprises computing a smooth L1 loss based on output of the softmax function of the row-wise regression.

Clause 9: The method according to any one of Clauses 1-8, wherein training the row-wise regression further comprises computing a confidence loss using a dice loss function.

Clause 10: The method according to any one of Clauses 1-9, wherein the y-end regression comprises an exponential function, and wherein training the y-end regression comprises computing a smooth L1 loss based on output of the exponential function of the y-end regression.

Clause 11: A system, comprising: a memory comprising computer-executable instructions; and one or more processors configured to execute the computer-executable instructions and cause the processing system to perform a method in accordance with any one of Clauses 1-10.

Clause 12: A system, comprising means for performing a method in accordance with any one of Clauses 1-10.

Clause 13: A non-transitory computer-readable medium comprising computer-executable instructions that, when executed by one or more processors of a processing system, cause the processing system to perform a method in accordance with any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, the term "connected to", in the context of sharing electronic signals and data between the elements described herein, may generally mean in data communication between the respective elements that are connected to each other. In some cases, elements may be directly connected to each other, such as via one or more conductive traces, lines, or other conductive carriers capable of carrying signals and/or data between the respective elements that are directly connected to each other. In other cases, elements may be indirectly connected to each other, such as via one or more data busses or similar shared circuitry and/or integrated circuit elements for communicating signals and data between the respective elements that are indirectly connected to each other.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
generating a set of feature tensors by processing an input image using a convolutional neural network;
generating a set of localizations by processing the set of feature tensors using a localization network;
generating a set of horizontal positions by processing the set of feature tensors using row-wise regression;
generating a set of end positions by processing the set of feature tensors using y-end regression; and
determining a set of lane marker positions based on the set of localizations, the set of horizontal positions, and the set of end positions.

2. The method of claim 1, wherein determining the set of lane marker positions comprises:
identifying a first subset of localization positions, from the set of localizations that exceeds a defined threshold; and
for each respective localization of the first subset of localization positions, selecting a corresponding horizontal position of the set of horizontal positions based on a respective end position of the set of end positions.

3. The method of claim 2, wherein determining the set of lane marker positions comprises:
selecting a second subset from the first subset of localization positions using non-maximum suppression based on distance between respective localizations in the first subset of localization positions, wherein the distance is defined based on horizontal distance between overlapping regions.

4. The method of claim 1, further comprising:
applying a random sample consensus (RANSAC) technique to the set of lane marker positions; and
fitting the set of lane marker positions to one or more polynomial curves.

5. The method of claim 1, wherein:
the convolutional neural network is a feature pyramid network comprising a bottom-up pathway and a top-down pathway connected by one or more lateral connections; and
prior to generating the set of localizations, the set of horizontal positions, and the set of end positions, the set of feature tensors are aggregated using a set of learned weights.

6. The method of claim 5, wherein the set of learned weights comprise:
a first weight corresponding to the localization network;
a second weight corresponding to the row-wise regression; and
a third weight corresponding to the y-end regression.

7. The method of claim 1, wherein training the localization network comprises computing a cross-entropy loss based on output of the localization network and a ground-truth location of one or more lane markers, wherein the ground-truth location comprises a center point and at least one end point.

8. The method of claim 1, wherein the row-wise regression comprises a softmax function, and wherein training the row-wise regression comprises computing a smooth L1 loss based on output of the softmax function of the row-wise regression.

9. The method of claim 8, wherein training the row-wise regression further comprises computing a confidence loss using a dice loss function.

10. The method of claim 1, wherein the y-end regression comprises an exponential function, and wherein training the y-end regression comprises computing a smooth L1 loss based on output of the exponential function of the y-end regression.

11. A processing system, comprising:
a memory comprising computer-executable instructions; and
one or more processors configured to execute the computer-executable instructions and cause the processing system to perform an operation comprising:
generating a set of feature tensors by processing an input image using a convolutional neural network;
generating a set of localizations by processing the set of feature tensors using a localization network;
generating a set of horizontal positions by processing the set of feature tensors using row-wise regression;
generating a set of end positions by processing the set of feature tensors using y-end regression; and
determining a set of lane marker positions based on the set of localizations, the set of horizontal positions, and the set of end positions.

12. The processing system of claim 11, wherein determining the set of lane marker positions comprises:
identifying a first subset of localization positions, from the set of localizations that exceeds a defined threshold; and
for each respective localization of the first subset of localization positions, selecting a corresponding horizontal position of the set of horizontal positions based on a respective end position of the set of end positions.

13. The processing system of claim 12, wherein determining the set of lane marker positions comprises:
selecting a second subset from the first subset of localization positions using non-maximum suppression based on distance between respective localizations in the first subset of localization positions, wherein the distance is defined based on horizontal distance between overlapping regions.

14. The processing system of claim 11, the operation further comprising:
applying a random sample consensus (RANSAC) technique to the set of lane marker positions; and
fitting the set of lane marker positions to one or more polynomial curves.

15. The processing system of claim 11, wherein:
the convolutional neural network is a feature pyramid network comprising a bottom-up pathway and a top-down pathway connected by one or more lateral connections; and
prior to generating the set of localizations, the set of horizontal positions, and the set of end positions, the set of feature tensors are aggregated using a set of learned weights.

16. The processing system of claim 15, wherein the set of learned weights comprise:
a first weight corresponding to the localization network;
a second weight corresponding to the row-wise regression; and
a third weight corresponding to the y-end regression.

17. The processing system of claim 11, wherein training the localization network comprises computing a cross-entropy loss based on output of the localization network and a ground-truth location of one or more lane markers, wherein the ground-truth location comprises a center point and at least one end point.

18. The processing system of claim 11, wherein the row-wise regression comprises a softmax function, and wherein training the row-wise regression comprises computing a smooth L1 loss based on output of the softmax function of the row-wise regression.

19. The processing system of claim 18, wherein training the row-wise regression further comprises computing a confidence loss using a dice loss function.

20. The processing system of claim 11, wherein the y-end regression comprises an exponential function, and wherein training the y-end regression comprises computing a smooth L1 loss based on output of the exponential function of the y-end regression.

21. A non-transitory computer-readable medium comprising computer-executable instructions that, when executed by one or more processors of a processing system, cause the processing system to perform an operation comprising:
generating a set of feature tensors by processing an input image using a convolutional neural network;
generating a set of localizations by processing the set of feature tensors using a localization network;
generating a set of horizontal positions by processing the set of feature tensors using row-wise regression;
generating a set of end positions by processing the set of feature tensors using y-end regression; and
determining a set of lane marker positions based on the set of localizations, the set of horizontal positions, and the set of end positions.

22. The processing system of claim 21, wherein determining the set of lane marker positions comprises:
identifying a first subset of localization positions, from the set of localizations that exceeds a defined threshold; and
for each respective localization of the first subset of localization positions, selecting a corresponding horizontal position of the set of horizontal positions based on a respective end position of the set of end positions.

23. The processing system of claim 22, wherein determining the set of lane marker positions comprises:
selecting a second subset from the first subset of localization positions using non-maximum suppression based on distance between respective localizations in the first subset of localization positions, wherein the distance is defined based on horizontal distance between overlapping regions.

24. The processing system of claim 21, the operation further comprising:
   applying a random sample consensus (RANSAC) technique to the set of lane marker positions; and
   fitting the set of lane marker positions to one or more polynomial curves.

25. The processing system of claim 21, wherein:
   the convolutional neural network is a feature pyramid network comprising a bottom-up pathway and a top-down pathway connected by one or more lateral connections; and
   prior to generating the set of localizations, the set of horizontal positions, and the set of end positions, the set of feature tensors are aggregated using a set of learned weights.

26. The processing system of claim 25, wherein the set of learned weights comprise:
   a first weight corresponding to the localization network;
   a second weight corresponding to the row-wise regression; and
   a third weight corresponding to the y-end regression.

27. The processing system of claim 21, wherein training the localization network comprises computing a cross-entropy loss based on output of the localization network and a ground-truth location of one or more lane markers, wherein the ground-truth location comprises a center point and at least one end point.

28. The processing system of claim 21, wherein the row-wise regression comprises a softmax function, and wherein training the row-wise regression comprises computing a smooth L1 loss based on output of the softmax function of the row-wise regression.

29. The processing system of claim 28, wherein training the row-wise regression further comprises computing a confidence loss using a dice loss function.

30. The processing system of claim 21, wherein the y-end regression comprises an exponential function, and wherein training the y-end regression comprises computing a smooth L1 loss based on output of the exponential function of the y-end regression.

* * * * *